United States Patent

Bagrodia et al.

Patent Number: 5,182,345
Date of Patent: Jan. 26, 1993

[54] BLENDS OF COPOLY(ARYLENE SULFIDE) AND POLCARBONATE

[75] Inventors: Shriram Bagrodia; David R. Fagerburg; Joseph J. Watkins; Paul B. Lawrence, all of Kingsport, Tenn.

[73] Assignee: Eastman Kodak Company, Rochester, N.Y.

[21] Appl. No.: 729,249

[22] Filed: Jul. 12, 1991

[51] Int. Cl.$^5$ ............................................ C08F 283/02
[52] U.S. Cl. ..................................... 525/462; 525/537
[58] Field of Search ................................. 525/537, 462

[56] References Cited

U.S. PATENT DOCUMENTS

| | | | |
|---|---|---|---|
| 2,513,188 | 6/1950 | Macallum | 260/79 |
| 2,538,941 | 1/1951 | Macallum | 260/79 |
| 4,046,836 | 9/1977 | Adelmann et al. | 525/537 |
| 4,786,713 | 11/1988 | Rule et al. | 528/389 |
| 4,792,600 | 12/1988 | Rule et al. | 528/212 |
| 4,855,393 | 8/1989 | Rule et al. | 528/389 |

OTHER PUBLICATIONS

Japanese Patent No. 51059952—See Derwent Abstract 001618450 WPI Acc No.: 76-52872X/28.
German Patent No. DE3900-260—See Derwent Abstract WPI Acc No.: C 89-279344.

Primary Examiner—Melvyn I. Marquis
Assistant Examiner—Helen F. Lee
Attorney, Agent, or Firm—Charles R. Martin; William P. Heath, Jr.

[57] ABSTRACT

Disclosed is composition comprising an admixture of
(A) from 99 to 1 weight percent, based on the weight of the admixture, of a copoly(arylene sulfide) corresponding to the structure $$[(-A-S-)_{1-x}(-A-S-S-)_x]_n$$

wherein A is a divalent substituted or unsubstituted aromatic radical, x is in the range of 0.5 to 0.001 and n is at least 25, and
(B) from 1 to 99 weight percent, based on the weight of the admixture, of an bisphenol-A polycarbonate having an inherent viscosity of at least 0.3.

5 Claims, No Drawings

BLENDS OF COPOLY(ARYLENE SULFIDE) AND POLCARBONATE

The invention relates to blends of a copoly(arylene sulfide) and a polycarbonate.

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment. These polymers can be prepared by reacting p dichloro benzene with sodium sulfide in a polar organic solvent to produce poly(phenylene sulfide) and the by product sodium chloride in accordance with U.S. Pat. No. 2,513,188 and U.S. Pat. No. 2,538,941. An improvement on this procedure involves adding N haloamides as catalysts.

Recently copoly(arylene sulfides) have been discovered. These polymers can be described as having repeating units corresponding to the structure

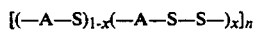

wherein x is in the range of 0.5 to 0.001, A is a divalent aromatic radical and n is at least 200 and is preferably in the range of 500 to 5,000.

Polycarbonates are a high performance, amorphous engineering thermoplastic that is characterized by high clarity, heat and foame resistance, dimensional stability and very good impact strenght Even though polycarbonates have many desirable properties, they suffer from low chemical and stress cracking resistance.

It has now been discovered that copoly(arylene sulfide) can be blended with polycarbonate to prepare a composition exhibiting enhanced toughness compared to . copoly(arylene sulfide) and enhanced chemical resistance of polycarbonate.

Blends of polycarbonates and poly(phenylene sulfide) are disclosed in Japanese Patent No 51059952. Blends of polycarbonates, poly(phenylene sulfide) and a third thermoplastic polymer are disclosed in German Patent number DE3900 260.

The composition of this invention is blend which can be broadly described as an admixture of (A) from 99 to 1 weight percent, based on the weight of the admixture, of a copoly(arylene sulfide) corresponding to the structure

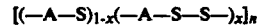

wherein A is a divalent substituted or unsubstituted aromatic radical, x is in the range of 0.5 to 0.001and n is at least 25, and (B) from 1 to 99 weight percent, based on the weight of the admixture, of polycarbonate.

The copoly(arylene sulfide) polymers useful in this invention are identical to the copoly(arylene sulfide) polymers disclosed in U.S. Pat. No. 4,786,713 and U.S. Pat. No. 4,855,393, herein incorporated by reference, except that the minimum value of n of the copoly(arylene sulfide) polymers useful in this invention is lower than the minimum value of n for the copoly(arylene sulfide) polymers which is disclosed in these references. The copoly(arylene sulfide) polymers useful in this invention are therefore inherent in the disclosure of these references because as the molecular weight builds up toward the minimum value of n of at least 200 which is disclosed in these references the molecular weight passes through a molecular weight associated with the lower minimum value of n of 25 of the copoly(arylene sulfide) polymers of this invention. The copoly(arylene sulfide) polymers useful in this invention can be prepared by those skilled in the art by following the teachings of these references and controlling the stoichiometry, time, temperature and other variables of the reaction to achieve a molecular weight associated with a value of n which is at least 25.

The diiodoaromatic compounds which can be utilized to prepare the copoly(arylene sulfide) useful in this invention, include unsubstituted or substituted aromatics which have two iodine substituents. Preferred diiodoaromatic compounds are the diiodobenzenes, diiodonaphthalenes and diiodobiphenyls which may be unsubstituted or substituted. More preferably the diiodoaromatic compounds suitable for the present invention include p diiodobenzene, m diiodobenzene, p,p' diiodobiphenyl, p,p'-diiodobiphenyl, p,p'-diiododiphenyl ether and 2,6 diiodonaphthalene. Most preferably the diiodo compound is p diiodobenzene.

The polycarbonate useful in this invention is prepared from carbonic acid and 2,2 bis (4 hydroxy phenyl) propane, often called bisphenol A. These polycarbonates and the method of their preparation are well known in the art. For example, U.S. Pat. No. 4,945,130 discloses the polycarbonates useful in this invention.

In this invention the average molecular weight of the polycarbonate is at least 10,000, preferably at least 50,000 and most preferably at least 80,000 as measured by light scattering.

The blends of this invention can be prepared by known techniques for blending polymers. For example, the polymers can be coextruded in convention twin screw extrusion equipment. Also, powders of both polymers may be admixed and the admixed powders extruded in a single screw extruder. Preferably, an admixture of powdered polymer is prepared and the admixture powder is extruded in a single screw extruder.

The amount of copoly(arylene sulfide) is in the range of 99 to 1 weight percent, preferably 85 to 15 weight percent, based on the weight of the admixture. The amount of polystyrene is in the range of 1 to 99 weight percent, preferably 15 to 85 weight percent, based on the weight of the admixture.

The compositions of this invention can be used for preparation of various shaped articles such as pellets, fibers and molded articles. The polymer can be prepared into these shaped articles by conventional processes, such as injection molding, melt spinning, and melt extrusion.

The compositions of this invention can additionally contain fillers, nucleating agents and reinforcing materials in the form of fibers, minerals, powders or mats. For example, the compositions can contain glass fibers, aluminum oxide, calcium oxide, silicon dioxide, Titanium dioxide, copper, kaolin, and the like.

The compositions of this invention are normally solid in the sense that at typical room temperatures and pressures the compositions are in a solid state as compared to a liquid state. The solid character of the composition results from both polymers having a sufficiently high molecular weight to be a solid.

The following examples are used to describe the invention and should be taken as illustrative and not restrictive.

EXAMPLE 1

This example illustrates the enhanced interfacial adhesion associated with the blends of this invention.

A blend of copoly(phenylene sulfide) and polycarbonate was prepared. The copoly(phenylene sulfide) was prepared by the melt phase reaction of sulfur and p di iodobenzene, as described in U.S. Pat. Nos. 4,786,713 and 4,792,600. The value of x was estimated to be about 0.10 as determined by elemental analysis. The melt viscosity of copoly(phenylene sulfide) at 300° C. at 25 Sec$^{-1}$ shear rate was about 5000 poise. A blend containing 20 wt % polycarbonate prepared from bisphenol A and 80 wt % copoly(phenylene sulfide) was prepared. The polycarbonate had a number-average molecular weight of about 85,000 as determined by light scattering. The two polymers were micropulverized, cryogenically, to particle size less than 1.0 mm. A physical blend of 3 g of polycarbonate and 12 g of copoly(phenylene sulfide) was made and well mixed. The powdered mixture of the above two polymers, 15 g by weight, was dried for at least 12 hours at 90° C. in a vacuum oven. The dried polymer mixture was melt extruded in an extruder having a die temperature of about 615° F. The film was cryogenically fractured in liquid nitrogen and the fracture surface morphology was determined using a scanning electron microscope. A scanning electron microscope of the cryogenically fractured surface clearly shows good interfacial adhesion between the two phases.

EXAMPLE 2

This example illustrates the enhanced interfacial adhesion associated with the blends of this invention.

Example 1 was repeated except 80% by weight polycarbonate and 20% by weight copoly(phenylene sulfide) was used. A scanning electron photomicrograph of the fractured surface of the blend clearly indicates very good interfacial adhesion between the two phases.

We claim:

1. A composition comprising an admixture of
   (A) from 99 to 1 weight percent, based on the weight of the admixture, of a copoly(arylene sulfide) corresponding to the structure $[(-A-S-)_{1-x}(-A-S-S-)_x]_n$ wherein A is a divalent substituted or unsubstituted aromatic radical, x is in the range of 0.5 to 0.001 and n is at least 25, and
   (B) from 1 to 99 weight percent, based on the weight of the admixture, of an bisphenol-A polycarbonate having an inherent viscosity of at least 0.3.

2. The composition of claim 1 wherein the divalent aromatic radical is provided by diiodobenzene, diiodonaphthalene or diiodobiphenyl.

3. The composition of claim i wherein the divalent aromatic radical is p diiodobenzene, m-diiodobenzene, p,p'-diiodobiphenyl, p,p'-diiododiphenyl ether or 2,6 diiodonaphthalene.

4. The composition of claim 1 wherein the amount of component (A) is in the range of 85 to 15 weight percent and the amount of component (B) is in the range of 15 to 85 weight percent.

5. A composition comprising an admixture of
   (A) from 85 to 15 weight percent, based on the weight of the admixture, of a copoly(phenylene sulfide) corresponding to the structure

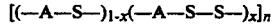

wherein A is a divalent phenylene radical, x is in the range of 0.5 to 0.001 and n is at least 50, and
   (B) from 15 to 85 weight percent, based on the weight of the admixture, of a bisphenol-A polycarbonate having an inherent viscosity of at least 0.5.

* * * * *